(12) United States Patent
Tholander

(10) Patent No.: US 6,207,054 B1
(45) Date of Patent: Mar. 27, 2001

(54) METHOD OF BIOLOGICALLY CLEANING POLLUTED WATER

(76) Inventor: Bent Tholander, 18, Vintappervej, DK-2800, Lyngby (DK)

( * ) Notice: Subject to any disclaimer, the term of this patent is extended or adjusted under 35 U.S.C. 154(b) by 0 days.

(21) Appl. No.: 09/214,298

(22) PCT Filed: Jul. 2, 1997

(86) PCT No.: PCT/DK97/00290

§ 371 Date: Aug. 30, 1999

§ 102(e) Date: Aug. 30, 1999

(87) PCT Pub. No.: WO98/01396

PCT Pub. Date: Jan. 15, 1998

(30) Foreign Application Priority Data

Jul. 3, 1996 (DK) .................................................. 0731/96

(51) Int. Cl.[7] .................................................. C02F 3/12
(52) U.S. Cl. .................. 210/605; 210/621; 210/624; 210/629; 210/630; 210/800; 210/195.1
(58) Field of Search .................................. 210/605, 607, 210/621, 624, 626, 903, 195.1, 195.3, 202, 253, 258, 259, 629, 630, 800

(56) References Cited

U.S. PATENT DOCUMENTS 5,624,563 * 4/1997 Hawkins .
5,908,554 * 6/1999 Tholander .
5,942,108 * 8/1999 Yang .

* cited by examiner

*Primary Examiner*—Chester T. Barry

(57) ABSTRACT

A method of biologically cleaning polluted water uses active sludge and at least three zones, where at least one zone operates as a biological treatment zone and at least two zones variably operate as a biological treatment zone and as a clarifying zone. By this method, the polluted water is fed to a zone operating as a permanent biological treatment zone, where a back-mixing is performed during a period between this zone and a zone variably operating as a biological treatment zone and which has operated as a clarifying zone during a previous period. As a result, the drawbacks are overcome which the known T- and V-channel methods are encumbered with.

26 Claims, 14 Drawing Sheets

CONVENTIONAL ACTIVE SLUDGE PLANT

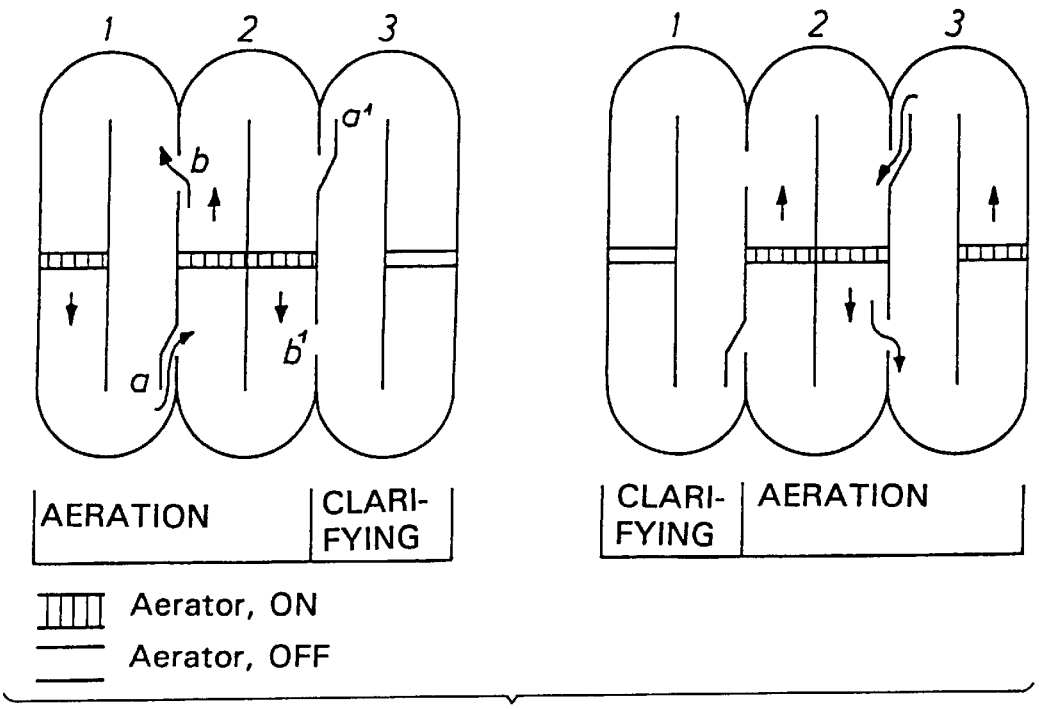
Fig. 2 VT - CHANNELS BACK-MIX < 2 TIMES PER HOUR
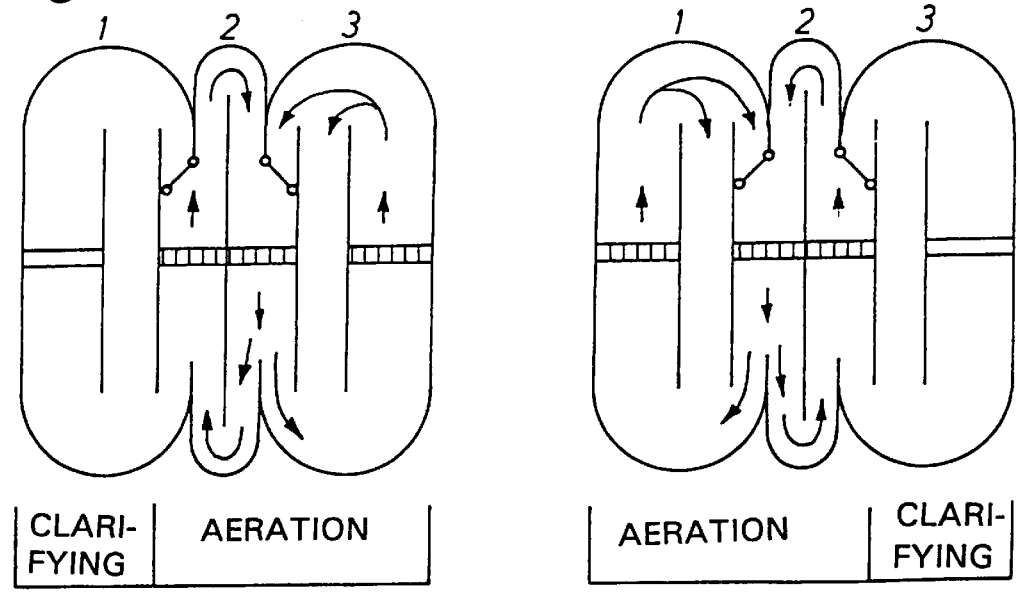
Fig. 3 VT - CHANNELS BACK-MIX 4 TIMES PER HOUR

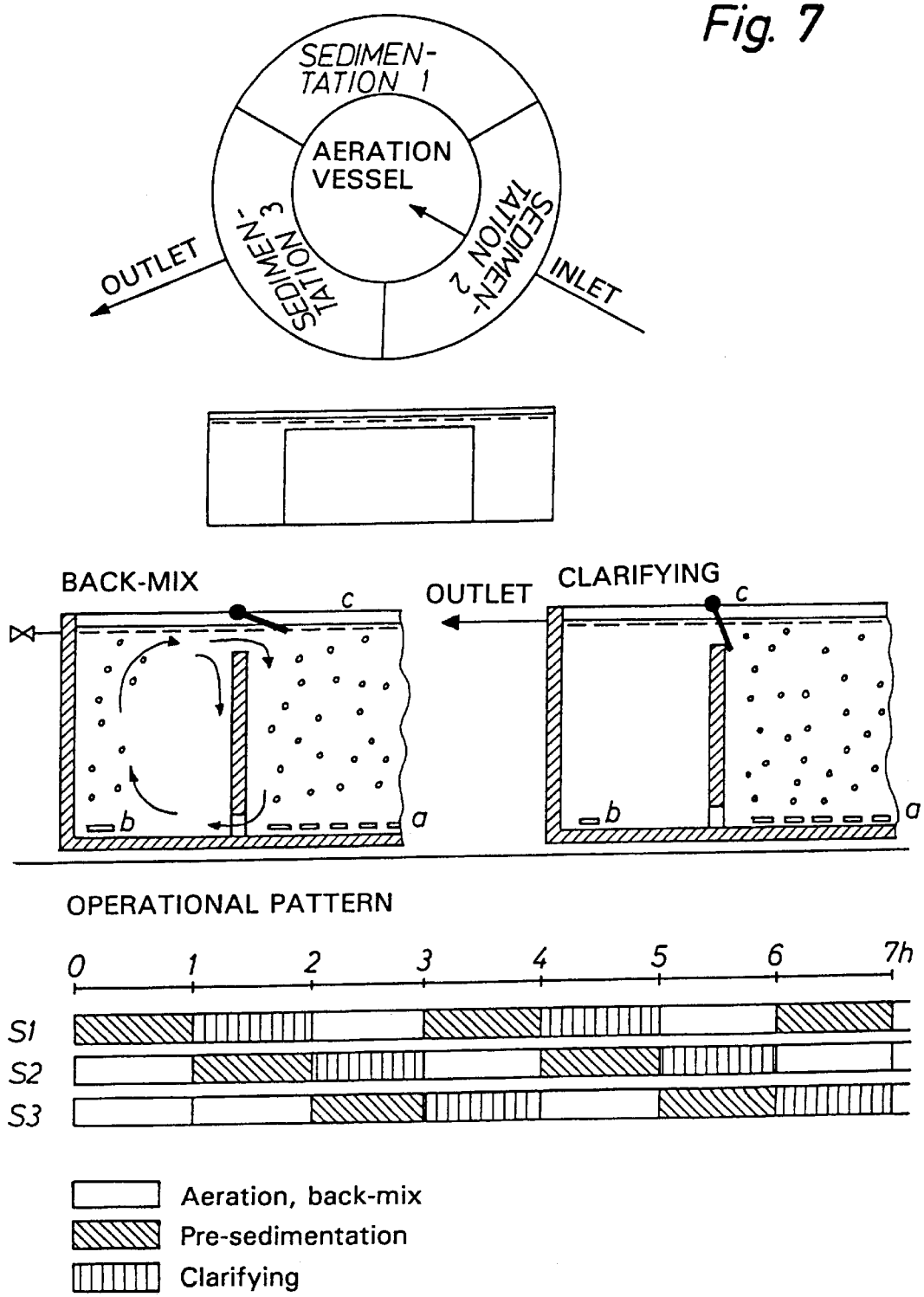

DYNAMIC SEQUENCING SEDIMENTATION
OVERLAPPING

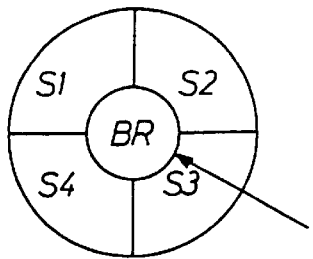

BR = Biological reactor = 3000
S1 = Sedimentation reactor = 1500
S2 " 1500
S3 " 1500
S4 " 1500

Influx  1000 m³/h

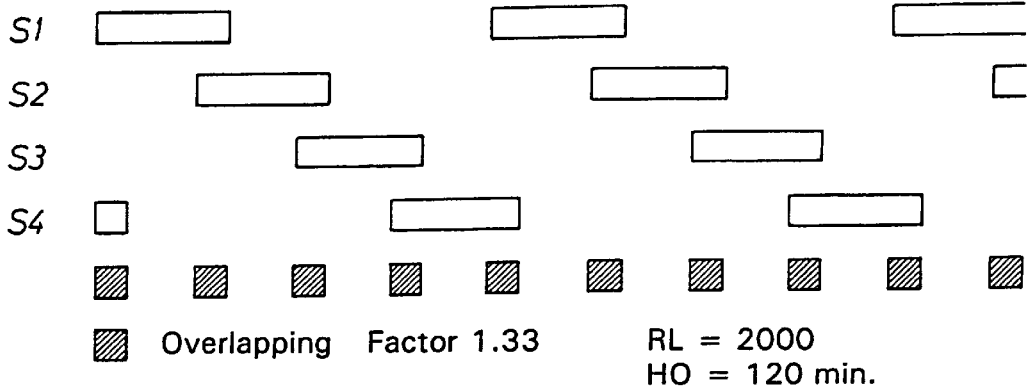

Aeration 60 min.  Pre-sedimentation 60 min.  Clarifying 60 min.

Overlapping Factor 1.33   RL = 2000
                         HO = 120 min.

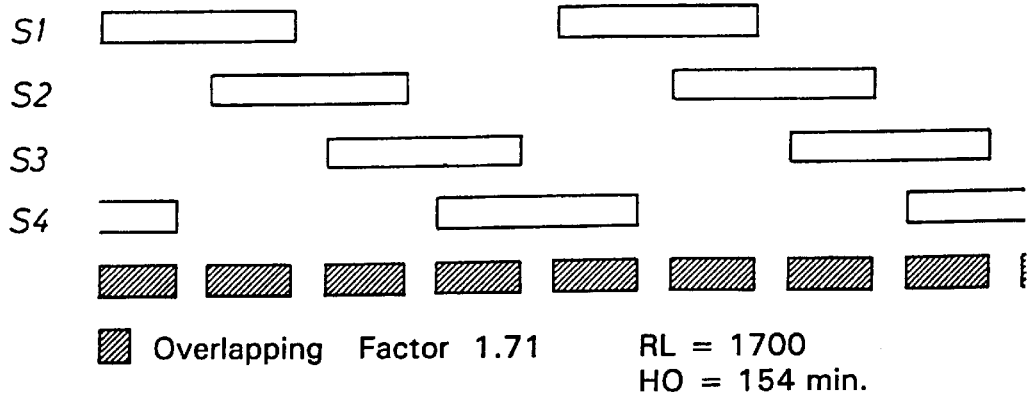

Aeration 60 min.  Pre-sedimentation 60 min.  Clarifying 60 min.

Overlapping Factor 1.71   RL = 1700
                         HO = 154 min.

0   60   120   180   240   300   360   420 min.

☐ Clarifying phase    RL = Relative storage capacity
                      HO = Hydraulic dwell time

Fig. 8

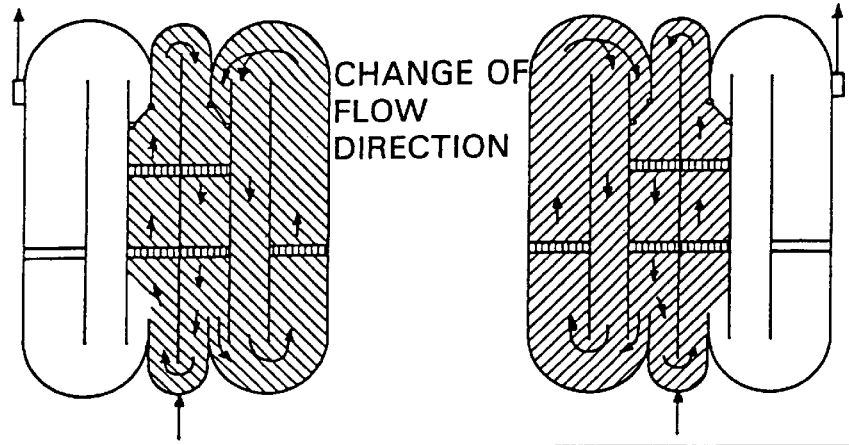
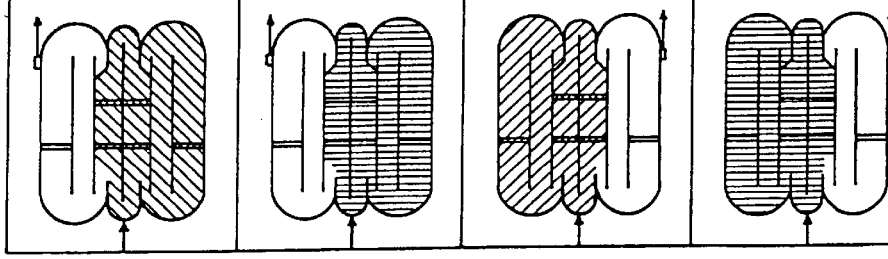
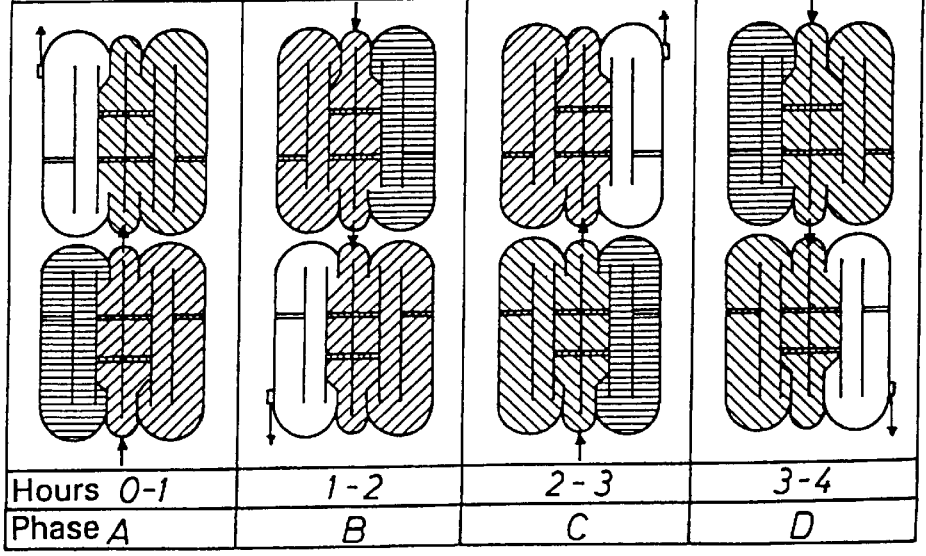
Fig. 10

DIFFUSERS

FLOW DIRECTION
PROPELLER
DIFFUSERS
OUTLET
SLUDGE RECIRCULATION

METHOD OF BIOLOGICALLY CLEANING POLLUTED WATER

TECHNICAL FIELD

The present invention relates to a method of biologically cleaning polluted water by employing active sludge and at least three zones, where at least one of said zones operates as a permanent biological treatment zone and at least two of said zones variably operate as a biological treatment zone and a clarifying zone.

BACKGROUND ART

The present description and claims use the expression "biological treatment zone" for an area or a section of for instance a container, a vessel, a reactor, a channel or a tank, wherein biologically active sludge is kept suspended by way of for instance a mechanical stirring or aeration under such aerobic or anaerobic conditions that the microorganisms present in the sludge consume the impurities in the water.

By the expression "sedimentation zone" is meant an area or section of for instance a container, a vessel, a reactor, a channel or a tank which is only exposed to an insignificant or no mechanical effect at all in such a manner that active sludge can settle.

By the expression "clarifying zone" is meant an area or section of for instance a container, a vessel, a reactor, a channel or a tank in which active sludge applies essentially in the settled state, and from which the cleaned water is decanted and drained off.

The expression "back-mix" is used for any process allowing a transfer of material from a first zone to a second zone while material is simultaneously being transferred from the second zone into the first zone. The "back-mix ratio" of a predetermined clarifying or sedimentation zone during a specific period is defined as the ratio of the volume amount of material (water with sludge suspended therein) being transferred with back-mixing from said zone during said period to another zone relative to the total volume of said clarifying and sedimentation zone.

DK-PS No. 131,181 discloses a method of the above type, where said method is ordinarily called the triple channel method or the T-channel method. This method employs three containers 1, 2 and 3. One container (container 2) operates as a permanent aeration zone, and the two remaining containers (i.e. containers 1 and 3) operate variably as aeration zone and clarifying zone. The three containers are connected to a common source for the feeding of waste water in such a manner that the feeding of waste water can alternate between the three containers. The containers are furthermore interconnected two by two.

When the triple channel is operated, container 1 operates during a first period as an aeration zone being fed with waste water while container 3 operates as a clarifying zone from which cleaned water is drained out. During a succeeding second period, waste water is fed to container 2 while container 1 still operates as an aeration zone and container 3 as a clarifying zone from which cleaned water is drained out. During a third period, the aeration is stopped in container 1 while waste water is still being fed to container 2 and cleaned water is being drained out of container 3. Subsequently, during a fourth period waste water is fed to container 3 which during this period operates as an aeration zone while container 1 operates as a clarifying zone from which cleaned water is drained out. During a fifth period, the waste water is fed to container 2 while container 3 still operates as an aeration zone and container 1 as a clarifying zone from which cleaned water is drained out. Finally during a sixth period, the aeration in container 3 is stopped while waste water is still being fed to container 2 and cleaned water is drained out of container 1.

This cycle including 6 periods is repeated over and over again. The patent description refers to a preferred embodiment where the total operational cycle lasts 8 hours. The periods 1 and 3 lasts 2 times 2 hours, and the periods 2, 3, 5, and 6 last 4 times 1 hour.

DK-PS No. 131,279 describes a method for denitrification of waste water by employing a triple channel system. This method is usually called the "BioDenitro"-method and is based on the same operational pattern as the triple channel described above. The biological treatment is, however, carried out in container 1 and 3 and alternately under anaerobic and aerobic conditions. Aerobic conditions are provided by the container in question being subjected to an aeration, whereas anaerobic conditions are provided by a relatively gentle stirring being performed in the container. Both functions can according to this Patent Specification be provided by a rotor installed in the container, said rotor running at a variable speed.

When a container is run under aerobic conditions, the $NH_3$—N present in the waste water is nitrified into $NO_3$—N. When the same container is run anaerobically during a later operational period, a denitrification takes place, i.e. the present $NO_3$—N is converted into free $N_2$ escaping into the atmosphere.

Owing to the continuously increasing requirements presented to denitrification of waste water, the T-channel method involving the BioDenitro-running is extensively used.

The T-channel method is, however, encumbered with a number of draw-backs:

During some operational periods, the waste water is fed to a container which later on is used as a clarifying container. As the draining out is carried out from this container, the aeration must continue for a period after termination of the feeding of waste water to said container in order to ensure that the required cleanness of the outlet is obtained.

The utilization of the aerators is unfortunately relatively low. When polluted water is fed to the clarifying zones, the oxygen demand applying to the indicated operational pattern is distributed with 31% to each of the clarifying zones and 38% to the permanent biological treatment zone. The degree of utilization of the total aeration installation is therefore only 49%, because 62% of the oxygen demand applies to the zones where the aerators are stopped part of the time, i.e. 5 out of 8 hours in the operational pattern dealt with.

Furthermore, the mean concentration of sludge (i.e. the average of the three containers) possible at the T-channel method is relatively low because sludge has a tendency to accumulate in the side channels. During the four hours where sludge is fed to the side channel (container 1 or 3), so much sludge can thus accumulate that the critical concentration of sludge of approximately 7 kg/m is easily exceeded when an mean concentration of sludge of more than approximately 4 kg/m$^3$ is involved.

DK-PS No. 123,814 discloses a method of cleaning waste water, said method ensuring a much better utilization of the aerators than the T-channel method. This method is ordinarily called the alternate channel or the V-channel method, and here a single container is divided into a main aeration part and two channel parts individually serving either as an aeration zone or as a clarifying zone. The aerators are arranged in the main aeration part continuously being fed with waste water. A typical operational pattern of this method includes the following four periods:

During a first three hour-period, one channel part operates as an aeration zone and the other channel part as a clarifying zone. Then the aerators are stopped for one hour during a second period. During a third three hour-period, the second channel part operates as an aeration zone and the first channel part as a clarifying zone. Then the aerators are stopped for one hour during a fourth period, and the described operational cycle is repeated.

In the V-channel method, the aerators are only stopped during the periods involving preparation of one channel part for the clarifying function, and the described operational pattern results in a degree of utilization of the aerators of 75%.

Despite the good degree of utilization of the aerators, the V-channel method is only used in a few waste water cleaning plants mainly on account of the structural limitations. In order to establish the best hydraulic conditions allowing the central aerators to circulate in two zones, the degree of freedom applying to the structural embodiment is limited, and it is not a good idea to position more than maximum two aerators in a plant section.

Another draw-back of the V-channel method is that the building depth is limited to 2.5 to 3 m, where large plants have a demand for building depths of 4 to 8 m in order to reduce the initial expenditure and the area need. Furthermore, like the T-channel method an extensive accumulation of sludge takes place during the relatively long clarifying period inside the clarifying zone with the effect that the rating of the plant for a maximum mean concentration of sludge is subject to limitations. Both V and T-channels are ordinarily rated for a maximum mean concentration of sludge of approximately 4 $kg/m^3$.

Another known method ensuring a high utilization of the aerators appears from FIG. 1 of the drawing. In this method, waste water is fed into a biological reactor including aeration units. The clarification is carried out by a permanent post-clarifying vessel, and the aerators in the biological reactor can therefore be utilized 100% of the time. The sludge being separated in the post-clarifying vessel must be returned by way of pumping to the biological reactor. The latter return flow increases, however, the water flow from the biological reactor to the post-clarifying vessel and consequently the amount of sludge transported thereto and separated therein is increased as well. The sedimentation inside the post-clarifying vessel results in a concentration of the sludge. This process is, however, carried out relatively slowly, and in practice it is not possible to achieve a concentration of sludge in the return flow of more than 8 to 10 $kg/m^3$.

The following Table I illustrates the necessary returning relative to the feeding of waste water versus the concentration of sludge in the biological reactor of FIG. 1 and under the assumption of a concentration of sludge in the return flow of 8 $kg/m^3$.

TABLE I

| Concentration of sludge in biological reactor ($kg/m^3$) | Return flow relative to feeding of waste water |
| --- | --- |
| 3.5 | 0.75 |
| 4.0 | 1.0 |

TABLE I-continued

| Concentration of sludge in biological reactor ($kg/m^3$) | Return flow relative to feeding of waste water |
| --- | --- |
| 4.5 | 1.25 |
| 5.0 | 1.5 |
| 5.5 | 2.1 |

Usually a plant is rated to carry out the described method of maintaining a concentration of sludge of 3.5 to 4 $kg/m^3$ in the biological reactor. As illustrated in Table I, this situation requires, however, a return flow of approximately the same volume as the feeding of waste water, which, of course, subjects the capacity of such a plant to an extensive limitation. Furthermore, it is necessary to include a return pump station of a high capacity.

DK-PS No. 131,279 describes a plant comprising two biological reactors which alternately are run aerobically and anaerobically, as well as a permanent post-clarifying vessel. This plant allows a denitrification of waste water, but it is, however, encumbered with the same draw-backs as the plant described above as far as the capacity is concerned. Moreover, the denitrification is carried out in only one step. However, when a very low concentration of impurities is desired it turned out to be very advantageous to carry out the denitrification in two steps, where the first step operates at high rates and a relatively high concentration of impurities.

BRIEF DESCRIPTION OF THE INVENTION

The object of the present invention is to provide a method of biologically cleaning polluted water, whereby the drawbacks of the methods described above have been overcome.

It turned out surprisingly that the above object is obtained by means of a method of biologically cleaning polluted water by employing active sludge and at least three zones, where at least one of said zones operates as a permanent biological treatment zone and at least two of said zones variably operate as a biological treatment zone and a clarifying zone, said method being characterised in that the polluted water is constantly fed to a zone operating as a permanent biological treatment zone, that the zone operating as a permanent biological treatment zone is aerated in case only one such zone applies, and that the aerators in this zone run continuously, as well as that during a specific period a back-mixing takes place between the zone operating as a permanent biological treatment zone and a variable zone operating as a biological treatment zone, said latter zone having operated as a clarifying zone during a previous period.

The back-mixing may by the present invention be carried out to a very varying extent. However, it turned out surprisingly that even with a relatively small back-mix ratio it is possible to obtain a neutralisation of the differences in sludge concentration between the permanent biological treatment zone and the zone earlier having operated as a clarifying zone, said neutralization being sufficient for keeping the sludge concentrations in the clarifying zones below the critical value of approximately 7 $kg/m^3$, at which a risk of sludge extraction applies.

A back-mix ratio of the variable treatment zone to the clarifying zone of 0.5 to 8, preferably 0.5 to 4, especially 0.75 to 2, is preferred.

A particular embodiment of the method according to the invention employs a permanent biological treatment zone and two zones variably operating as a biological treatment zone and a clarifying zone, said latter zones being individually hydraulically connected to the permanent biological treatment zone. Below this embodiment is referred to as the "VT-channel method".

A preferred operational pattern of this embodiment includes a cycle involving the following four periods:

During a first period, one variable zone (zone 1) operates as a biological treatment zone while the second variable zone (zone 3) operates as a clarifying zone. During the same period, a back-mixing is carried out between zone 1 and the permanent treatment zone (zone 2). Then during a second period, zone 1 operates as a sedimentation zone while zone 3 still operates as a clarifying zone. During a third period zone 3 operates as a biological treatment zone while zone 1 operates as a clarifying zone. During the same period, a back-mixing is carried out between zone 3 and the permanent treatment zone. Then during a fourth period, zone 3 operates as a sedimentation zone while zone 1 still operates as a clarifying zone. Then the described cycle is repeated.

When this embodiment is carried out, the concentration of sludge rises in zone 3 during the first and the second period due to the transport of sludge from the permanent biological treatment zone to zone 3. During the third period, the back-mixing implies that the differences in concentrations are neutralized between zone 3 and the permanent treatment zone with the effect that the concentration of sludge decreases in zone 3. In this manner a suitable sludge balance is maintained in the plant.

In other words, the neutralization of the sludge concentrations between the zones is independent of the flow of entering polluted water, which accordingly can be fed continuously to the permanent biological treatment zone. As a result, the oxygen demand is high in the very zone where the aerators run permanently, and the oxygen demand is low in the zones used for clarification during part of the time.

The described embodiment presents an oxygen demand of 18% in each of the variable treatment/clarifying zones and of 64% in the permanent biological treatment zone. The degree of utilization of the aerator installation is thus 63% for an operational pattern where a variable zone initially operates as a biological treatment zone for three hours and then as a sedimentation zone for one hour and finally as a clarifying zone for four hours (below called a 3,1,4-phase pattern).

The following Table II compares the utilization of the aerators of a T-channel (prior art) with the method according to the invention for three different phase patterns.

TABLE II

| Phase pattern* | Operating period of aerators in a variable zone (%) | | Yield of an aerator installation (%) | |
|---|---|---|---|---|
| (treat. sed., cla.) | T-channel (comp.) | acc. to the invention | T-channel (comp.) | acc. to the invention |
| 3,1,4 | 37.5 | 37.5 | 49 | 63 |
| 2,1,3 | 33.3 | 33.3 | 45 | 58 |
| 1,1,2 | 25 | 25 | 35 | 48 |

*number of hours for the operation of a variable zone as a biological treatment zone (with back-mixing), a sedimentation zone and a clarifying zone, respectively.

It appears from the above Table II, that the method according to the invention ensures a distinctly improved utilization of the aerators compared to the T-channel method for a predetermined phase pattern.

When most of the oxygen demand and the cleaning process apply to the permanent biological treatment zone, a shortening of the clarifying phases has only an insignificant effect on the degree of utilization of the aerators. A shortening of the clarifying phases has the effect that the operating period of the aerators in the variable zones only lasts for a minor part of a phase course because the reduction of the operational period has only an effect on a minor section of the total plant including the aeration installation.

A shortening of the period involving a feeding of sludge to the clarifying zone has the effect that the transport of sludge is reduced. As a result it is possible to increase the mean concentration of sludge in the plant without risking an overflow of sludge. A 1,1,2-phase pattern allows for instance achievement of an mean concentration of sludge of 4.7 to 5 kg/m$^3$.

A major advantage of the method according to the invention is that polluted water is never fed to a container which later on is to operate as a clarifying zone. When a relatively low back-mix ratio is employed, such as below 2, it is furthermore possible to ensure both that the major portion of the conversion takes place in the permanent biological treatment zone and that only a minor portion of said conversion takes place in the variable zones. The permanent biological treatment zone and the variable zones operate as a two-step biological reactor, where the first step involves relatively high concentrations of pollution and a high reaction rate and the second step involves low concentrations of pollution and a low reaction rate. As a result both 1) a low concentration of pollution in the outlet, and 2) a high operational reliability because the second step absorbs variations in the concentration, as well as 3) a higher average reaction rate in both treatment zones than by a treatment in one step are obtained at the same time.

Moreover it turned out surprisingly that the denitrification in a sedimentation phase continues at the same rate as in a zone operating as a treatment zone, at least at the beginning of said sedimentation phase where the sludge sinks to the bottom and causes a turbulence in the surrounding water. Moreover it turned out that organic substances and nitrate are converted in the sludge flocks, said organic substances and nitrate having been absorbed in the sludge while said sludge was suspended and in optimum contact with the polluted water during a previous biological treatment period. This denitrification can, however, only continue for a limited period before the sludge and polluted water are to be remixed. Thus an advantage of the present invention is that it operates with short phases.

An embodiment of the invention renders it possible to reduce the clarifying phases of a clarifying zone to approximately one hour, and this embodiment is particularly suited in connection with BioDenitro-operation. This embodiment is according to the the invention obtained by interconnecting two of the above described plants (VT-channels), each of these plants including a permanent biological treatment zone and two variable treatment/clarifying zones. The interconnection is established by way of a hydraulic connection between the two permanent biological treatment zones, and the two plants are driven in counterphase. It turned out that when polluted water is alternately fed to the first and the second of the two permanent treatment zones, and when the permanent treatment zone receiving polluted water is anaerobically run while the second permanent treatment zone is aerobically run, it is possible to obtain an ideal one-step denitrification in said permanent biological treatment zones while the variable treatment/clarifying zones operate as two-step denitrification reactors. Such an embodiment with two interconnected VT-channels driven in counterpha renders it possible to obtain a high degree of utilization of the aerators, more specifically 75 to 90%.

An embodiment of the invention including a plant with two interconnected V-channels driven in counterphase renders it possible to obtain a utilization degree of the aerators of 100%. When this embodiment furthermore implies that the polluted water is alternately fed to one and the other V-channel, and that the inlet zone is anaerobically run while the second permanent treatment zone is aerobically run, it turned out to be possible to obtain ideal phase periods for the denitrification process and at the same time to obtain a cleaning in two steps.

Another embodiment of the invention employing a plant with a permanent biological treatment zone, two variable treatment/clarifying zones as well as a permanent post-clarifying zone turned out to allow an increase of the concentration of sludge and at the same time a relatively low transport of sludge to the permanent post-clarifying zone in such a manner that the return flow of sludge from the post-clarifying zone to the permanent treatment zone can be kept at a low level compared to known plants with a permanent post-clarifying vessel. The presence of a permanent post-clarifying zone implies that it is not necessary to run the variable treatment/clarifying zones in order to obtain a total retaining of the sludge therein. The sludge concentrations in these zones can therefore be increased, and the phase preparing a zone for clarification by way of sedimentation without an outlet can be shortened or completely cut out.

BRIEF DESCRIPTION OF THE DRAWINGS

The invention is described in greater detail below with reference to the accompanying drawing, in which FIG. 10 illustrates an embodiment of the method according to the invention with two interconnected plants of the type shown in FIG. 3, FIG. 13 illustrates advantageous embodiments of a plant for carrying out the invention.

BEST MODE FOR CARRYING OUT THE INVENTION

Figure 1:
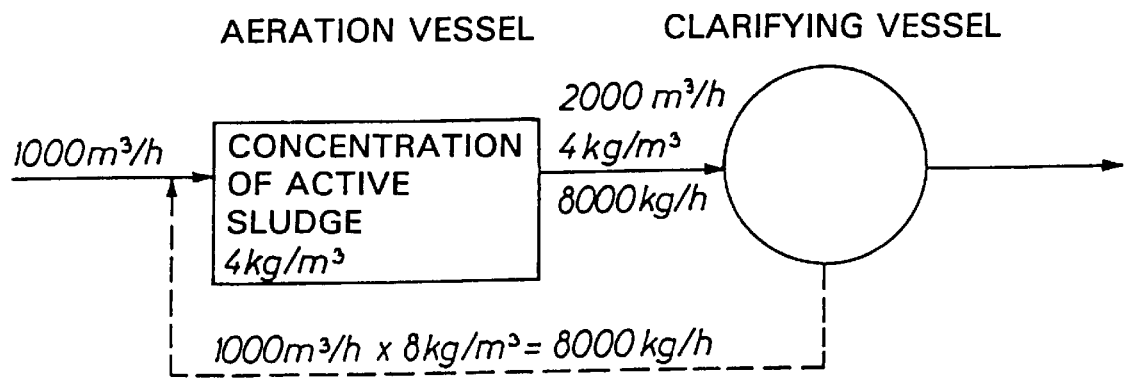
FIG. 1 shows as earlier mentioned a known method ensuring a high utilization of the aerators, FIG. 2 outlines an embodiment of a plant for carrying out the method according to the invention, said plant being particularly suited at relatively low back-mix ratios, FIG. 3 outlines an embodiment of a plant for carrying out the method according to the invention, said plant being particularly suited at relatively high back-mix ratios.

FIG. 2 shows a plant for carrying out the method according to the invention, said plant comprising three containers, where container 1 and 3 are variable treatment/clarifying zones, and container 2 is a permanent biological treatment zone. Container 1 and 3 are provided with openings a and a' to container 2, and in front of these openings a capture plate is arranged, said plate cutting off a partial flow and pressing said partial flow into the second container when the water in container 1 or 3 is set in horizontal circular flow. When water is pressed into the second container, a corresponding amount of water must return to the container from which said water came, the return flow taking place through the openings b and b'.

The openings b and b' are shaped such that water is not pressed into container 1 or 3 in connection with the horizontal circular flow inside container 2. The water only passes between container 2 and container 1 or 3 when the circular flow inside container 1 or 3 is set in motion. The openings are advantageously shaped such that the collecting openings a and a' in container 1 and 3 are provided at the bottom of the containers, and the openings b and b' are provided at the surface. As a result, the starting of the circular flow only causes the water containing most sludge to be pressed into container 2. Container 1 and 3 are provided with both aerators or stirrers and with an automatic overflow for discharging cleaned water in a clarifying phase. These overflows are closed when the associated container operates as a biological treatment zone or as a sedimentation zone.

Below a typical operational cycle is indicated of the above plant comprising the phases A to D:

Phase A (1 hour):

The aerators in container 1 have been activated in such a manner that a back-mixing is carried out between container 1 and 2. The overflow c in container 1 is closed whereas the overflow c' in container 3 is open, the latter container operating as a clarifying zone.

Phase B (1 hour):

The aerators in container 1 are stopped while the overflow c is kept closed and the overflow c' is kept open. During this phase, sludge settles in container 1 with the effect that a succeeding clarifying function for container 1 is prepared.

Phase C (1 hour):

The overflow c in container 1 is opened while the overflow c' in container 3 is closed. When the aerators of the container 3 are started, the circular flow is simultaneously started in said container 3 in such a manner that water is exchanged between container 3 and container 2 whereby sludge is returned to container 2, said sludge being accumulated in container 3 in phase A and B.

Phase D (1 hour):

This phase is laterally reversed relative to phase B, and during this phase the aerators in container 3 are stopped while the overflow c' is kept closed and the overflow c is kept open. During this phase, sludge settles in container 3 with the effect that a succeeding clarifying function for container 3 is prepared.

All phases involve a feeding of waste water to container 2, wherein the aerators are activated 100% of the time.

FIG. 3 shows a plant for carrying out the method according to the invention, said plant comprising three containers, where the containers 1 and 3 are variable treatment/clarifying zones, and container 2 is a permanent biological treatment zone. This plant is driven analogously with the procedure described for the plant shown in FIG. 2. The embodiment of the plant shown is, however, particularly advantageous in connection with high back-mix ratios. When the back-mix ratio is 4 or more, independent aerators need not be arranged in the variable zones because it is sufficient to install horizontal propellers for propelling the water. As a result, the initial expenditures are reduced.

Figure 4:
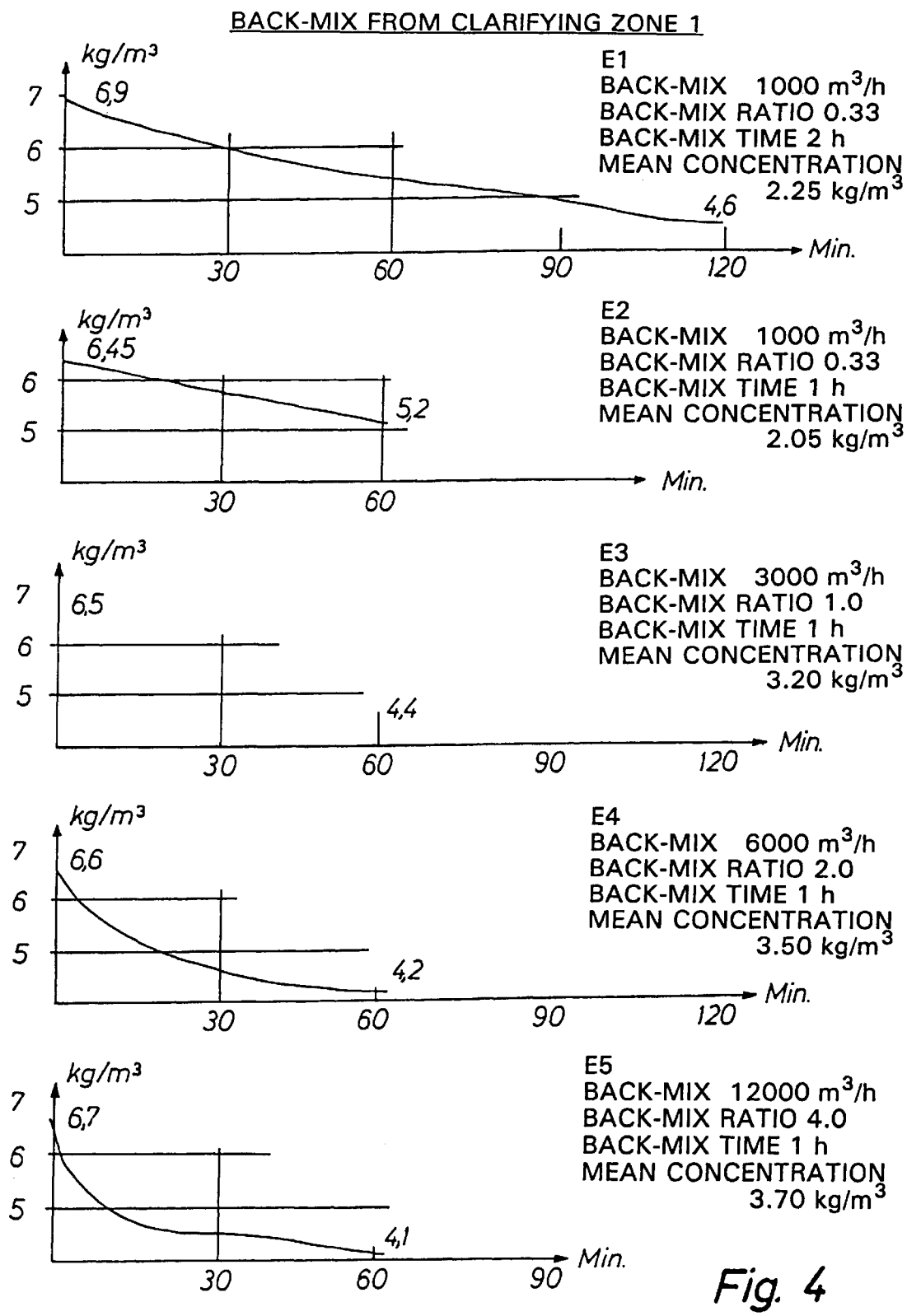
FIG. 4 shows the concentration of sludge versus the time in a variable zone operating as a biological treatment zone during a period involving a back-mixing and at different back-mix ratios.

FIG. 4 is a graphic view of the variation in the concentration of sludge in container 1 during phase A and by means of the method according to the invention illustrated in FIG. 2 or FIG. 3 involving various back-mix ratios.

The container volume is 3000 m$^3$ for each of the three containers, and the influx of polluted water to container 2 is 1000 m$^3$ per hour. The back-mix ratio is defined as the amount of water pressed into container 2 from container 1 per time unit and which accordingly is exchanged between said container 1 and said container 2, said amount of water being divided by the volume of container 1. According to this definition, a back-mix ratio of 1 in the present case corresponds to an exchange of 3000 m$^3$/h between container 1 and container 2, i.e. the volume of container 1 is exchanged by the volume of container 2 one time per hour.

In Example E1, phase A lasts two hours and phase B lasts one hour, i.e. container 3 operates as a clarifying vessel for three hours. The back-mix ratio is 1/3, i.e. approximately 0.33. Thus a final concentration of 6.9 kg/m$^3$ in a clarifying vessel, i.e. close to the critical limit (7 kg/M$^3$), results in an mean concentration of sludge in the plant of 4.4 kg/m$^3$.

When the duration of phase A is increased to three hours and the duration of the clarifying period is increased to four hours like the ordinarily used 3,1,4-phase pattern for T-channels, the mean concentration must be reduced to less than 4 kg/m$^3$ in order not to exceed the critical concentration of sludge.

If the duration of phase A is instead reduced to one hour corresponding to a clarifying period of 2 hours, the concentration of sludge only reaches 6.5 kg/m despite a relatively high mean concentration of sludge of 4.5 kg/m$^3$.

The examples E3, E4 and E5 use a 1,1,2-operational pattern, an mean concentration of sludge of 4.5 kg/m$^3$ and a back-mix ratio of 1, 2 and 4, respectively. It appears from the curves indicated that an increase of the back-mix ratio results in a faster transfer of sludge from container 1 to container 2, and furthermore that most of the transport takes place during the first part of the period. Thus the transport of sludge is minimal during the last 20 minutes of E3 and the last 40 minutes of E5. In addition it appears that the final concentration in the clarifying zone following a clarifying period is higher in E5 than in E3 because the sludge is transferred faster to container 2 and consequently also carried faster on to the clarifying zone (container 3). Consequently, both high back-mix ratios and long clarifying periods are disadvantageous for the clarifying function because both factors involve an increased transport of sludge to the clarifying zone. A low back-mix ratio like in E1 and E2 results, however, in a low concentration of sludge in the permanent biological treatment zone, more specifically 2.25 and 2.05 kg/m$^3$, respectively, where E3, E4 and E5 ensure 3.3, 3.5 and 3.7 kg/m$^3$, respectively. A back-mix ratio of approximately 1 and a phase period for phase A (and C) of approximately one hour renders it possible to use an mean concentration of sludge of up to approximately 5 kg/m without exceeding the critical limit. At the same time a sufficient concentration of sludge is obtained in the permanent biological treatment zone. On the other hand, it is not desired either to shorten phases A and C considerably relative to phase B and D because the purpose of the back-mix phase is to bring sludge from the clarifying zone into contact with nitrate-containing water which is exchanged from container 2. Instead of shortening phase A and C so as to reduce the back-mixing, it is much more advantageous to insert short periods during these phases, said short periods involving a stop of stirrers or aerators in the variable zone in such a manner that a denitrification can take place.

Figure 5:
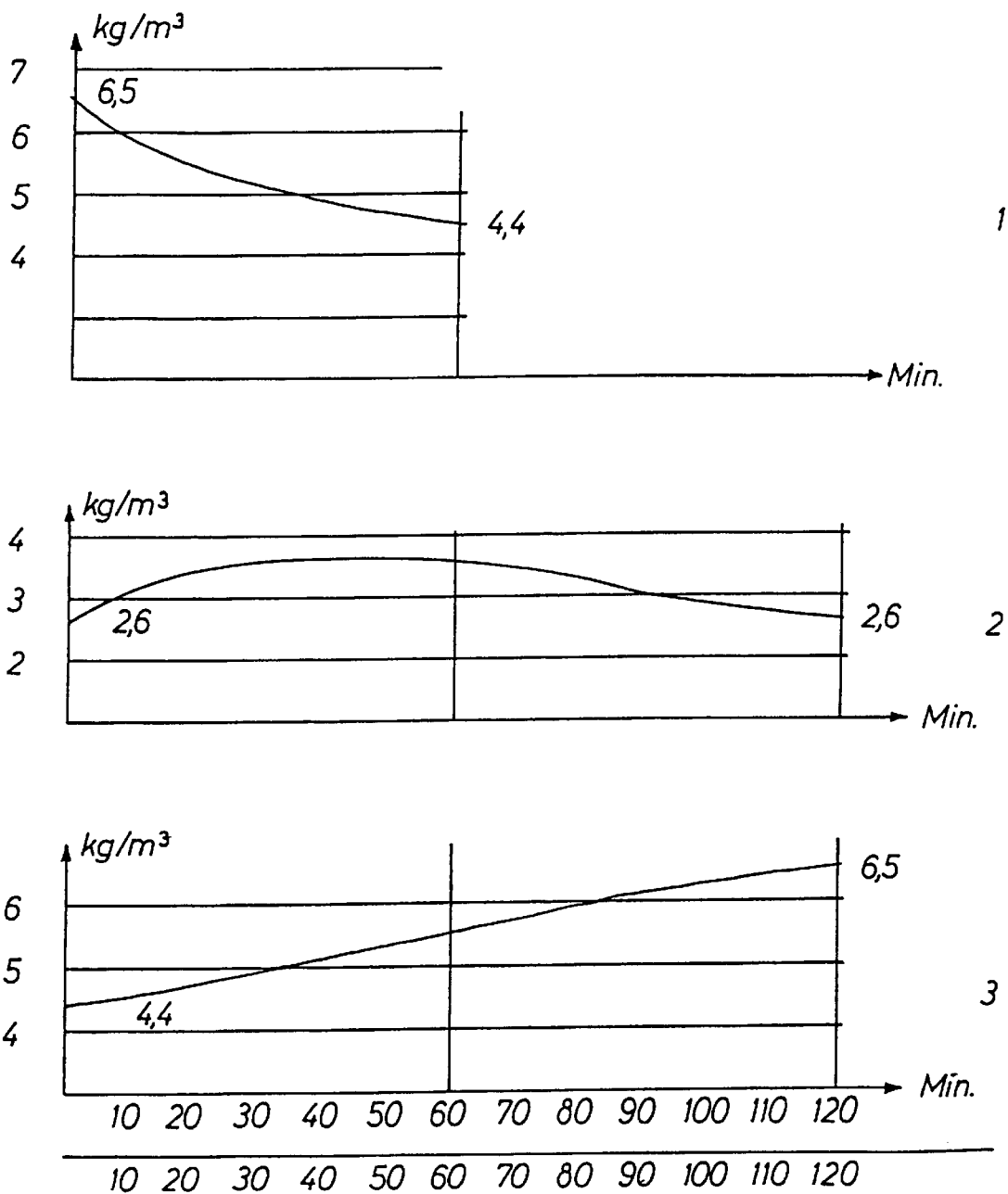
FIG. 5 shows the concentration of sludge versus the time in a VT-channel in the variable zone operating as a biological treatment zone, in the permanent biological treatment zone, and in the variable zone operating as a clarifying zone, respectively, where a back-mix ratio of 1 and a 1,1,1-operational pattern are involved.
Figure 6:
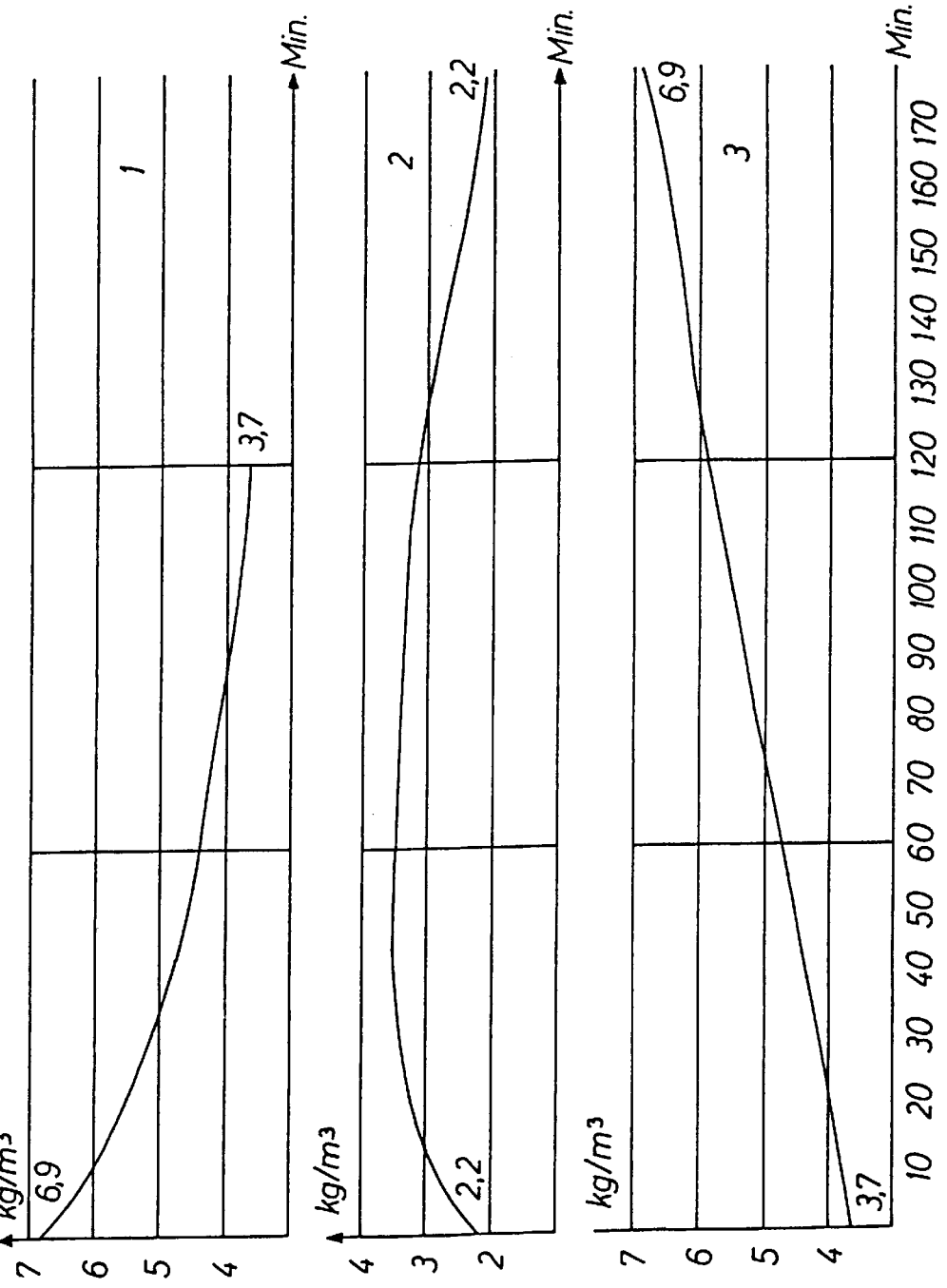
FIG. 6 shows the concentration of sludge versus the time in a VT-channel in the variable zone operating as a biological treatment zone, in the permanent biological treatment zone, and in the variable zone operating as a clarifying zone, respectively, where a back-mix ratio of 1 and a 2,1,3-operational pattern are involved, FIG. 7 outlines a plant and an operational pattern for carrying out a particular embodiment of the invention and employing a permanent biological treatment zone and three variable treatment/clarifying zones, all zones being provided with units for diffuser aeration, FIG. 8 outlines a plant and an operational pattern for carrying out a particular embodiment of the invention and employing a permanent biological treatment zone and four variable treatment/clarifying zones.

For the sake of clarity, FIGS. 5 and 6 are graphic views of the concentration of sludge in containers 1, 2 and 3 versus the period relative to a 1,1,1 and a 2,1,3-operational pattern, respectively.

FIG. 7 outlines a plant and an operational pattern for carrying out a particular embodiment of the invention employing a permanent biological treatment zone and three variable treatment/clarifying zones.

In the outlined embodiment all zones have been provided with units for diffuser aeration. The diffusers a can be uniformly distributed across the entire bottom inside the permanent biological treatment zone with the result that no circulating water movements are caused inside this container. The resulting transfer of oxygen per kWh is higher than in connection with ordinary rotor aerators. In the variable treatment/clarifying zones, the diffusers b are arranged in one side of the container which results in a vertical, circulating water flow when air is blown through said diffusers. The number of diffusers is adapted such that both a suitable water circulation and an aeration meeting the oxygen demand inside the clarifying zone are obtained. The air is supplied by a central compressor by way of a valve readjustment. As a result, only the diffuser installation need to be increased in order to compensate for the interval periods in the clarifying zone. The back-mixing is carried out when the horizontal water circulation presses water into the permanent biological treatment zone through openings in the top of said zone, and when a corresponding amount of water returns to the variable zone through openings at the bottom of said zone. When all sludge is to be retained in the variable zone in connection with sedimentation and clarifying zones, a slightly hinged closure c can be arranged at the uppermost openings by means of a stop rail towards the variable zone. This closure prevents whirling water in the permanent treatment zone from penetrating into the variable zone. When the water circulation is started in the variable zone the water flow presses up the above closure. When this embodiment furthermore is used together with a permanent post-clarifying vessel, the closure is no longer necessary.

As the present embodiment uses three variable zones, it is possible to employ a short phase cycle, such as one hour aeration, one hour sedimentation, and one hour clarification. If the plant according to this embodiment is dimensioned with a total volume corresponding to the above plant with a permanent treatment zone and two variable zones, the volume of each variable zone is 2000 m$^3$, i.e. ⅔ of the volume of a variable zone in the plant with two variable zones. However, as the clarifying period of the above phase cycle has been halved from two hours to one hour, less sludge is accumulated in the variable zones and the mean concentration of sludge can be increased. The present embodiment may, especially in deep vessels, involve some transport of sludge from the clarifying zone to the permanent biological treatment zone during the clarifying phase. The latter is due to the difference in specific gravity between sludge and the aerated water in the biological zone because the pressure from the settling sludge presses the sludge through the openings in the bottom. Such an effect implies that the concentration of sludge in the variable zones can hardly reach the critical limit of 7 kg/m$^3$.

FIG. 8 outlines a plant and two operational patterns for carrying out a particular embodiment of the invention employing a permanent biological treatment zone and four variable treatment/clarifying zones. It appears from the operational pattern that it is possible to let a clarifying zone continue its operation for a period after the variable zone has started its function, said zone operating as a clarifying zone in the subsequent phase. An overlapping clarifying operation is particularly useful when it is desired to obtain an increased clarifying capacity, such as by way of an increased water flow in rainy weather. It is also possible with two variable clarifying zones to operate with an overlapping sedimentation. The advantage of using three or more zones is that it is possible to use such an operational pattern without the clarifying period for each clarifying zone growing unsuitably long.

Figure 9:
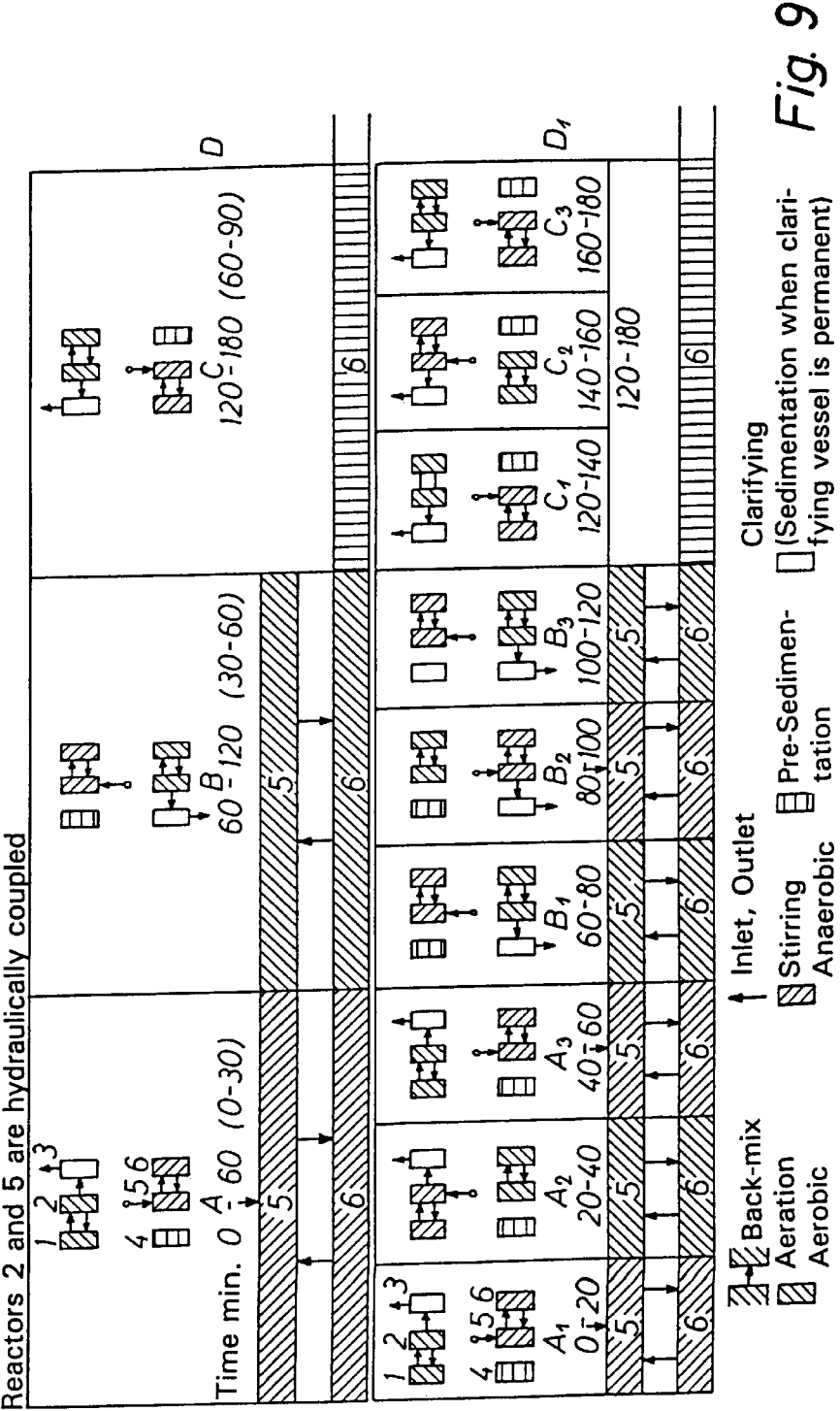
FIG. 9 illustrates an embodiment of the method according to the invention with two modules, each module comprising a permanent biological treatment zone and two variable treatment/clarifying zones, and whereby a denitrification is carried out.

FIG. 9 illustrates an embodiment of the method according to the invention with two interconnected modules, where each module comprises a permanent biological treatment zone and two variable treatment/clarifying zones (corresponding to the plants shown in FIGS. 2 and 3), More specifically, the two modules are interconnected at the two permanent biological treatment zones, i.e. container 2 is hydraulically coupled to container 5. The two permanent zones can be connected with an opening when they are built together in the position shown in the Figure, or they can be interconnected by way of a channel provided the modules are arranged side by side. The inlet can be uniformly distributed between the two permanent treatment zones when it is desired preferably to remove organic substance, or the inlet can be changed between said two permanent treatment zones, and anaerobic conditions can be established in the inlet zone when denitrification operation is desired. The basic pattern of denitrification operation including the four phases A, B, C and D with a period of each phase lasting one hour appears from the top of the Figure. Thus the four clarifying zones succeed one another in such a manner that the clarifying period of each zone has been reduced to one hour.

When the aerators are rated to a constant aerobic operation, the running period in the variable zones lasts 50% of the possible period, and the total degree of utilization is 74%. As a result, an improvement is obtained relative to operation of a single module, such as corresponding to the plants outlined in FIGS. 2 and 3.

When denitrification is desired, the one hour phases used in the basic pattern are not optimal because most of the conversion is performed in a relatively short period with the result that the remaining period is wasted time. The phases can, however, be subdivided, cf. A1, A2, A3 and B1, B2, B3 etc. The time division and the number of divisions can be varied in response to the conditions. The variable zones operate in the basic pattern with one hour biological treatment with back-mixing under aerobic conditions before the one-hour sedimentation phase starts. During this phase the remaining nitrate is removed before the overflow is opened and the one-hour clarifying phase is started. The pattern with the short phases, cf. below, implies that an increased portion of the denitrification takes place before the sedimentation phase is started. In the illustrated patterns, a variable zone is always operated as an aerobic treatment zone during the period up to the sedimentation phase, and the remaining nitrogen is therefore present in nitrate form. As a result, a dynamic system is provided which is based on a simple basic module, and which in an ideal manner meets the process conditions applying to varying load conditions and outlet requirements.

FIG. 10 illustrates an embodiment of the method according to the invention with two interconnected plants of the type shown in FIG. 3, When only a plant of the type shown in FIG. 3 is used, the rotors must be stopped during the operation of the one-hour phases A, B, C, D each time a variable zone is to be prepared for the clarifying function.

However, when two such plants are interconnected, cf. the bottom of the Figure, it is possible to achieve a continuous operation of the aerators in the central sections by employing the operational pattern also outlined. The latter is due to the fact that the clarifying function alternates between the two plants. During the clarification from one plant, the clarifying period can be prepared in the second plant by way of sedimentation in a variable zone. Accordingly, it is possible merely to turn the flowing direction in the first plant at the end of the clarifying period and to perform the sedimentation without an outlet in the variable zone being cut off by the float closure. In this manner the utilization degree of the aerators is significantly increased, cf. the following Table III showing a comparison of the utilization of the aerators of each plant with two interconnected plants of the type shown in FIG. 3.

TABLE III

| | Degree of utilization (%) | |
| --- | --- | --- |
| Phase pattern* (treat. sed., cla.) | 1 plant | 2 coupled plants |
| 3, 1, 4 | 62.5 | 90 |
| 2, 1, 3 | 55.8 | 86 |
| 1, 1, 2 | 41.7 | 75 |

Figure 11A:
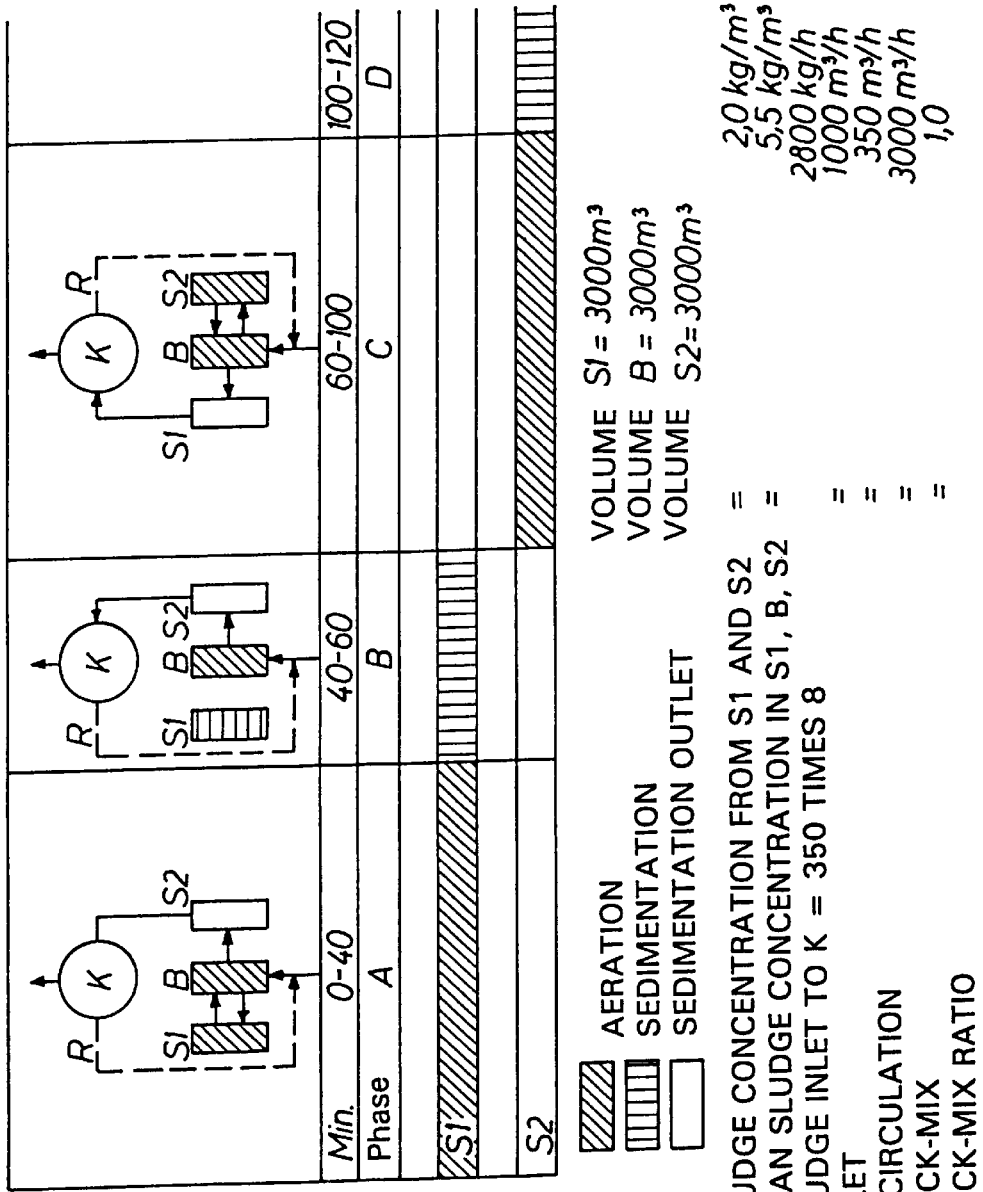
FIG. 11 illustrates an embodiment of the method according to the invention employing one plant with a permanent aeration zone, two variable treatment/clarifying zones as well as a permanent post-clarifying zone, FIG. 12 outlines a plant and an operational pattern for carrying out a particular embodiment of the invention employing two permanent biological treatment zones, two variable treatment/clarifying zones and optionally a permanent post-clarifying zone.
Figure 11B:
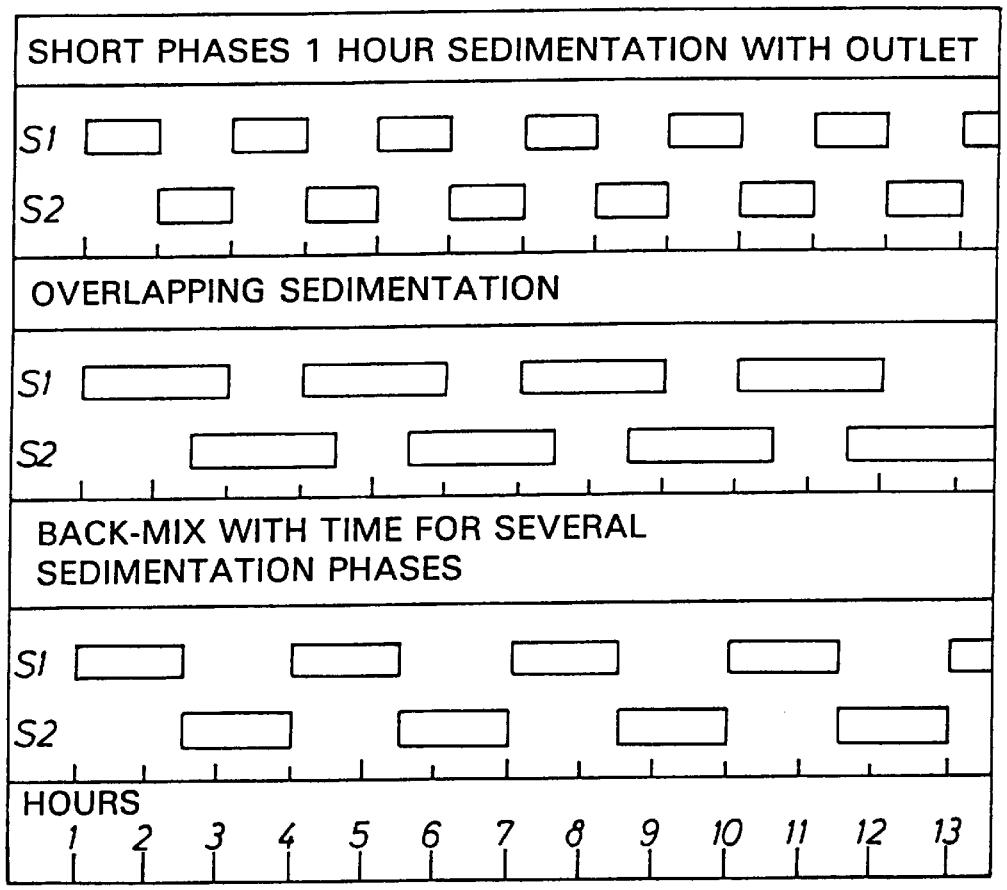

FIG. 11 illustrates an embodiment of the method according to the invention employing one plant with a permanent biological aeration zone, two variable treatment/clarifying zones as well as a permanent post-clarifying zone.

As the final clarification related to this embodiment takes place from the permanent post-clarifying zone, nothing but a partial retaining of the sludge must be obtained in the variable clarifying zones. In the illustrated example, the concentration of sludge in the flow to the permanent post-clarifying vessel is 2 kg/m³. The latter necessitates a recirculation of the sludge from the permanent post-clarifying vessel to the permanent treatment zone of 350 m³/h, which is significantly less than the 1000 m³/h required by the prior art shown in FIG. 1. Furthermore, the amount of sludge to be separated per hour by the post-clarifying vessel is only 2800 kg compared to 8000 kg for the prior art shown in FIG. 1. A further advantage of the present embodiment is that the mean concentration of sludge in the permanent treatment zone and the variable treatment/clarifying zones is 5.5 kg/m³ compared to 4 kg/m³ in the plant in FIG. 1. In addition it should be noted that a running of the plant shown in FIG. 1 with a concentration of sludge of 5.5 kg/m³ necessitates a recirculation of sludge of 2.1 times the inlet of waste water, i.e. 6200 m³/h, which is quite unrealistic.

The cycle of a variable treatment/clarifying zone is in the example 40 minutes biological treatment with a back-mix ratio of 1, 20 minutes sedimentation without outlet and 60 minutes clarification with outlet to the permanent clarifying zone. The possibility of operating with a high concentration of sludge has been utilized in order to limit the volume of the plant.

As shown at the bottom of the Figure many other operational patterns are possible including an overlapping sedimentation whereby the clarifying capacity can be increased, such as in rainy weather where the influx is suddenly increased. A sludge-free discharge from variable clarifying zones can be obtained for plants of this type, of above, and therefore it is also possible to dimension the plant such that the discharge takes place directly from a variable clarifying zone during some of the period in such a manner that the permanent clarifying zone is relieved and can be of a reduced size. When the periods are extended in which the variable zones operate as biological treatment zones, it is not necessary to involve a back-mixing during the entire period out of respect for the sludge balance, and accordingly it is possible to insert short sedimentation phases in this period where an additional denitrification takes place.

Figure 12:
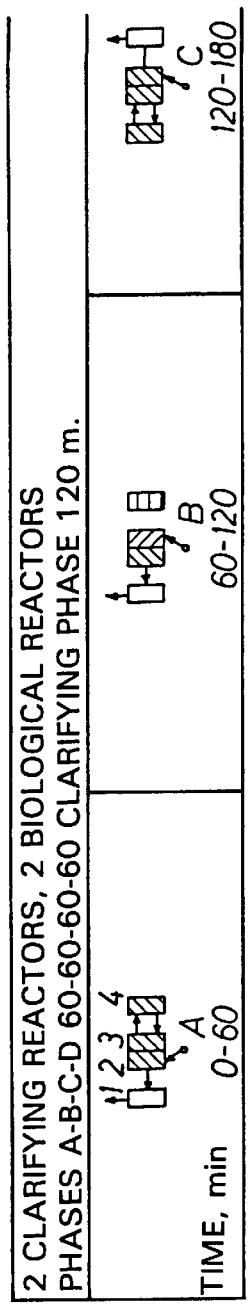
Figure 13A:
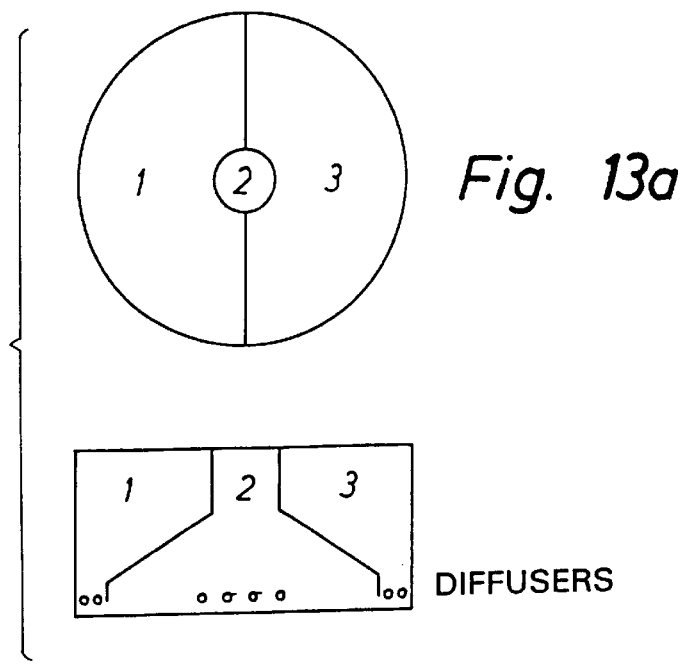
FIG. 13a shows an embodiment of the basic module.

Optimum conditions for the denitrification require a division of the permanent biological treatment zone into two parts, and the influx alternates between said parts at the same time as anaerobic conditions are provided in the influx zone. The latter appears from FIG. 12 outlining a plant and an operational pattern for carrying out a particular embodiment of the invention employing two permanent biological treatment zones, two variable treatment/clarifying zones and optionally a permanent post-clarifying zone, FIG. 13a shows an advantageous embodiment of the basic module for the plant with 6 to 10 m deep vessels. Here 2 refers to the permanent aeration vessel while 1 and 3 are variable zones. The illustrated embodiment ensures a large surface in the clarifying zones, from which the cleaned water is to be decanted, and the major portion of the aeration vessel is positioned in the deep portion with the maximum oxygen uptake.

The inclining bottom in the clarifying zones implies that the sludge sinks in the still periods and is pressed by way of gravitation back to the aeration vessel 2.

As a result, the back-mix ratio can be reduced, but said back-mixing is still necessary.

Figure 13B:
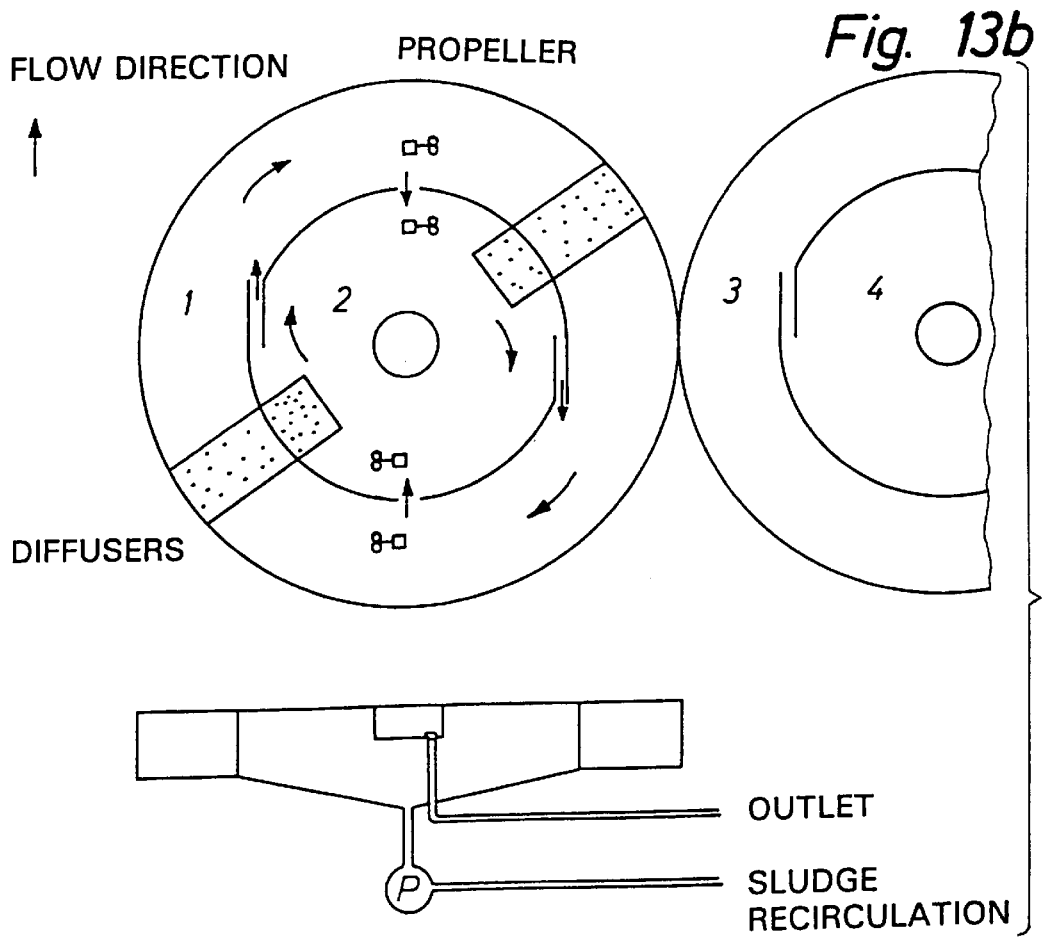
FIG. 13b shows an example of the operational pattern shown in FIG. 12 of the method according to the invention.

FIG. 13b shows an advantageous embodiment with very large vessels, where a horizontal water flow may present an advantage. This embodiment can be used in connection with both flat and deep vessels. The variable treatment/clarifying zone is placed in the middle, 2 and 4, and the permanent treatment zone is placed in the outer ring, 1 and 3. The units for the aeration/stirring inside both the inner cylinder and the outer ring can be diffusers/propellers or rotors. It is simple procedure to build the central cylinder with a bottom inclining towards the centre. Then the sludge flows towards the deepest location during the sedimentation phases, and a recirculation flow can be established with a high concentration from this location. As a result, the clarifying periods can be extended without involving an overflow of sludge, but the back-mixing in the treatment phases is still a necessity.

Figure 14:
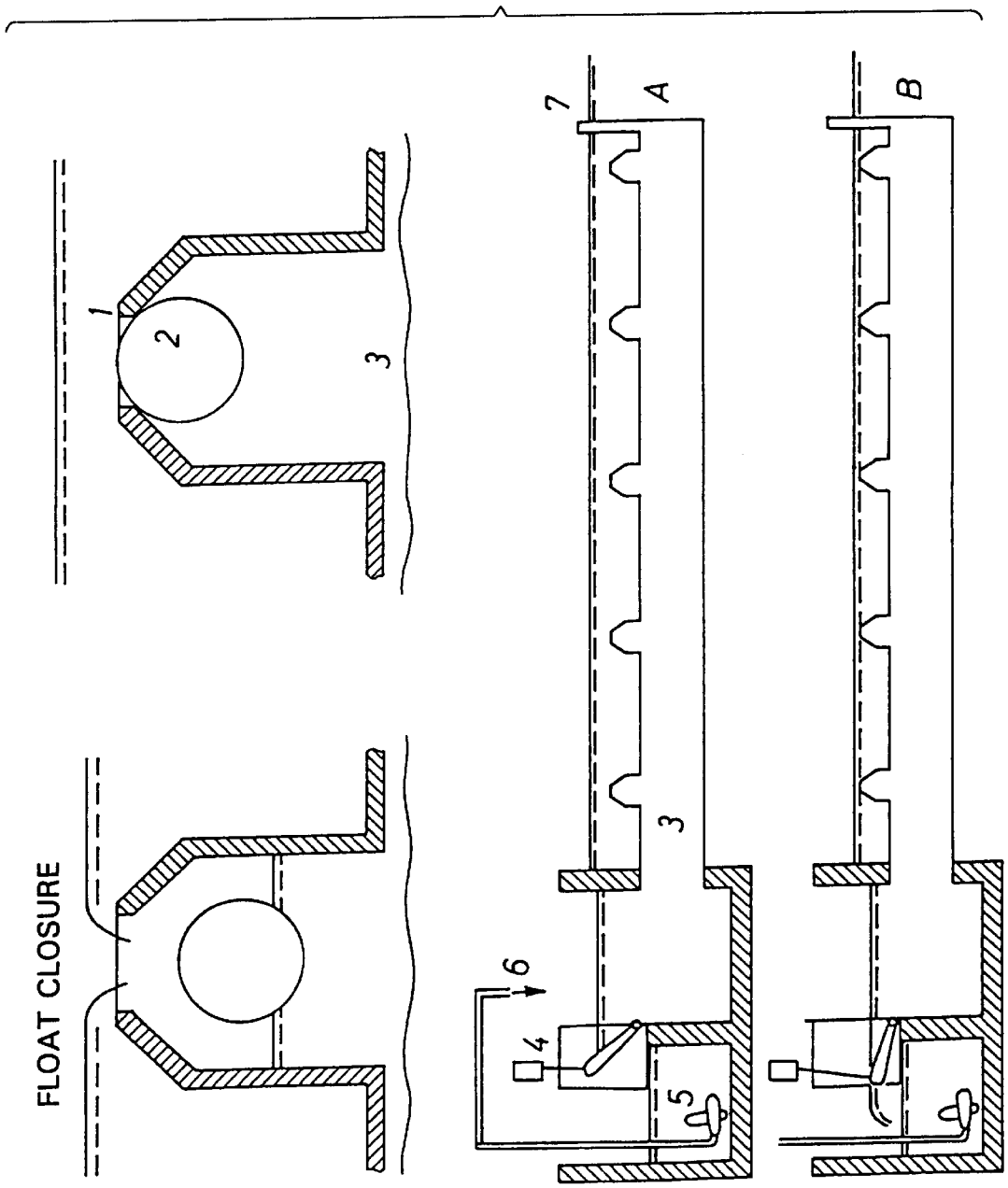
FIG. 14 shows an automatical overflow with a float closure.

FIG. 14 shows a float closure which particularly advantageously can be used in a variable treatment/clarifying zone in connection with the emptying of cleaned water therefrom while carrying out the method according to the invention. The float closure comprises one or more nozzles 1 arranged at the water surface and provided with float bodies 2, such as a ball or a pipe closed at both ends. The nozzles are arranged on a pipe 3 extending to a discharge chamber provided with an automatic valve or an overflow rim 4. When the overflow rim 4 is opened, the water level is lowered with the result that the float body is lowered too and allows a free passage through the nozzles 1. When the overflow rim 4 is closed, the water level in 3 rises and the float bodies rise so as to close the nozzles. An overpressure can optionally be established by placing a small pump 5 in the discharge chamber and by pumping water into 3. The pipe 3 must then be provided with an overflow 7 for adjustment of the pressure in 3.

The advantage of the described float closure is that is operated merely by means of an automatic valve and optionally a small pump. The ordinary systems for emptying cleaned water from clarifying zones employ vertical, movable overflow rims driven by a motor, and large plants necessitate the use of several rims placed in their respective clarifying zones with a motor for each rim.

What is claimed is:

1. A method of biologically cleaning polluted water by employing active sludge and at least three zones, of which at least one operates as a permanent biological treatment zone and at least two zones variably operate as a biological treatment zone and a clarifying zone, characterised in that (a) the variable zones are connected to the permanent biological treatment zone by means of a one way gate designated in such a way that flow created by the aerators in the variable zones can pass to the permanent biological treatment zone, whereas flow created by the aerators in the permanent biological treatment zone cannot pass to the variable zones; (b) the polluted water is constantly fed to a zone operating as a permanent biological treatment zone; (c) the aerators in this zone run continuously, and (d) during a period a back-mixing is carried out between said zone operating as a permanent biological treatment zone and a variable zone operating as a biological treatment zone, the latter zone operating as a clarifying zone during a previous period.

2. A method as claimed in claim 1, characterised in that the back-mix periods ensure a back-mixing to such an extent that a resulting back-mix ratio for the variable zone in question, operating as a biological treatment zone, of 0.1 to 8 is achieved.

3. A method as claimed in claim 2 wherein said ratio is 0.5 to 4.

4. A method as claimed in claim 2 wherein said ratio is 0.75 to 2.

5. A method as claimed in claim 1, characterised in that the permanent biological treatment zone (zone 2) and the two zones variably operating as a biological treatment zone and a clarifying zone (zones 1 and 3, respectively) are used, where zone 2 is hydraulically coupled to both zone 1 and zone 3, and where the zones are run according to an operational cycle including the following phases A to D:

| Phase | Zone 1 | Zone 3 |
|---|---|---|
| A | Biological treatment, back-mixing with zone 2 | Clarification |
| B | Sedimentation | Clarification |
| C | Clarification | Biological treatment, back-mixing with zone 2 |
| D | Clarification | Sedimentation. |

6. A method as claimed in claim 5, characterised in that the duration of each of the phases A and C is in the range of 30 to 240 minutes and that the duration of each of the phases B and D is in the range of 0 to 90 minutes.

7. A method as claimed in claim 6 wherein the duration of each of the phases A and C is 40 to 120 minutes and the duration of each of the phases B and D is 20 to 70 minutes.

8. A method as claimed in claim 1, characterised in that the permanent biological treatment zone (zone 1) and the two zones variably operating as a biological treatment zone and a clarifying zone plus an additional zone variably operating as a biological treatment zone and a clarifying zone (zones S1, S2, and S3, respectively) are used, where zone 1 is hydraulically coupled to each of the zones S1, S2 and S3, and where the zones are run according to an operational cycle including the following phases A to C:

| Phase | Zone S1 | Zone S2 | Zone S3 |
|---|---|---|---|
| A | Biological treatment, back-mixing with zone 1 | Clarification | Sedimentation |
| B | Sedimentation | Biological treatment, back-mixing with zone 1 | Clarification |
| C | Clarification | Sedimentation | Biological treatment, back-mixing with zone 1. |

9. A method as claimed in claim 8, characterised in that the duration of each of the phases A, B and C is in the range of 30 to 120 minutes.

10. A method as claimed in claim 9 wherein said duration is 40 to 90 minutes.

11. A method as claimed in claim 1, characterised in that the permanent biological treatment zones and an additional permanent biological treatment zone (zones 2 and 5, respectively) and the two zones variably operating as a biological treatment zone and a clarifying zone plus an additional two zones variably operating as a biological treatment zone and a clarifying zone (zones 1, 3, 4, and 6, respectively) are used, where the zones 1 and 2, 2 and 3, 2 and 5, 4 and 5, as well as 5 and 6 are hydraulically interconnected, and where the zones are run according to an operational cycle including the following phases A to D:

| Phase | Zone 1 | Zone 2 | Zone 3 |
|---|---|---|---|
| A | Aerobic biological treatment, back-mixing with zone 2 | Aerobic biological treatment, back-mixing with zone 1 | Clarification |
| B | Sedimentation | Influx of polluted water, anaerobic biological treatment, back-mixing with zone 3 | Anaerobic biological treatment, back-mixing with zone 2 |
| C | Clarification | Aerobic biological treatment, back-mixing with zone 3 | Aerobic biological treatment, back-mixing with zone 2 |
| D | Anaerobic biological treatment, back-mixing with zone 2 | Influx of polluted water, anaerobic biological treatment, back-mixing with zone 1 | Sedimentation |

| Phase | Zone 4 | Zone 5 | Zone 6 |
|---|---|---|---|
| A | Sedimentation | Influx of polluted water, anaerobic biological treatment, back-mixing with zone 6 | Anaerobic biological treatment, back-mixing with zone 6 |
| B | Clarification | Aerobic biological treatment, back-mixing with zone 6 | Aerobic biological treatment, back-mixing with zone 5 |
| C | Anaerobic biological treatment, back-mixing with zone 5 | Influx of polluted water, anaerobic biological treatment, back-mixing with zone 4 | Sedimentation |
| D | Aerobic biological treatment, back-mixing with zone 5 | Aerobic biological treatment, back-mixing with zone 4. | Clarification |

12. A method as claimed in claim 1, characterised in that the permanent biological treatment zone and an additional permanent biological treatment zone (zones 2 and 3, respectively) and the two zones variably operating as a biological treatment zone and a clarifying zone (zones 1 and 4, respectively) are used, where the zones 1 and 2, 2 and 3, as well as 3 and 4 are hydraulically interconnected, and where the zones are run according to an operational cycle including the following phases A to D:

| Phase | Zone 1 | Zone 2 | Zone 3 | Zone 4 |
|---|---|---|---|---|
| A | Clarification | Influx of polluted water, aerobic biological treatment | Aerobic biological treatment, back-mixing with zone 4 | Aerobic biological treatment, back-mixing with zone 3 |
| B | Clarification | Aerobic biological treatment | Influx of polluted water, anaerobic biological treatment | Sedimentation |
| C | Aerobic biological treatment, back-mixing with zone 2 | Aerobic biological treatment, back-mixing with zone 1 | Influx of polluted water, aerobic biological treatment | Clarification |
| D | Sedimentation | Influx of polluted water, anaerobic biological treatment. | Aerobic biological treatment | Clarification |

13. A method as claimed in claim 1, characterised in that a period includes an overlapping clarification from at least two of the variable treatment/clarifying zones.

14. A method as claimed in claim 13 wherein at least one of said clarifying periods is extended for a predetermined operational cycle without an overlapping clarification.

15. A method as claimed in claim 1, characterised in that an outlet extends from a variable clarifying zone to a permanent post-clarifying vessel, from which cleaned water is decanted and drained off, and where sludge is returned to a permanent biological treatment zone.

16. A method as claimed in claim 2, characterised in that a permanent biological treatment zone (zone 2) and two zones variably operating as a biological treatment zone and a clarifying zone (zones 1 and 3, respectively) are used, where zone 2 is hydraulically coupled to both zone 1 and zone 3, and where the zones are run according to an operational cycle including the following phases A to D:

| Phase | Zone 1 | Zone 3 |
|---|---|---|
| A | Biological treatment, back-mixing with zone 2 | Clarification |
| B | Sedimentation | Clarification |
| C | Clarification | Biological treatment, back-mixing with zone 2 |
| D | Clarification | Sedimentation. |

17. A method as claimed in claim 16, characterised in that the duration of each of the phases A and C is in the range of 30 to 240 minutes and that the duration of each of the phases B and D is in the range of 0 to 90 minutes.

18. A method as claimed in claim 17 wherein said duration of each of the phases A and C is 40 to 120 minutes and the duration of each of the phases B and D is 20 to 70 minutes.

19. A method as claimed in claim 2, characterised in that the permanent biological treatment zone (zone 1) and the zones variably operating as a biological treatment zone and a clarifying zone plus an additional zone variably operating as a biological treatment zone and a clarifying zone, (zones S1, S2, and S3, respectively) are used, where zone 1 is hydraulically coupled to each of the zones S1, S2 and S3, and where the zones are run according to an operational cycle including the following phases A to C:

| Phase | Zone S1 | Zone S2 | Zone S3 |
|---|---|---|---|
| A | Biological treatment, back-mixing with zone 1 | Clarification | Sedimentation |
| B | Sedimentation | Biological treatment, back-mixing with zone 1 | Clarification |
| C | Clarification | Sedimentation | Biological treatment, back-mixing with zone 1. |

20. A method as claimed in claim 19, characterised in that the duration of each of the phases A, B and C is in the range of 30 to 120 minutes.

21. A method as claimed in claim 20 wherein said duration of each of the phases A, B, and C is 40 to 90 minutes.

22. A method as claimed in claim 2, characterised in that the two permanent biological treatment zones (zones 2 and 5, respectively) and two zones variably operating as a biological treatment zone and a clarifying zone plus two additional zones variably operating as a biological treatment zone and a clarifying zone(zones 1, 3, 4, and 6, respectively) are used, where the zones 1 and 2, 2 and 3, 2 and 5, 4 and 5, as well as 5 and 6 are hydraulically interconnected, and where the zones are run according to an operational cycle including the following phases A to D:

| Phase | Zone 4 | Zone 5 | Zone 6 |
|---|---|---|---|
| A | Sedimentation | Influx of polluted water, anaerobic biological treatment, back-mixing with zone 6 | Anaerobic biological treatment, back-mixing with zone 6 |
| B | Clarification | Aerobic biological treatment, back-mixing with zone 6 | Aerobic biological treatment, back-mixing with zone 5 |
| C | Anaerobic biological treatment, back-mixing with zone 5 | Influx of polluted water, anaerobic biological treatment, back-mixing with zone 4 | Sedimentation |
| D | Aerobic biological treatment, back-mixing with zone 5 | Aerobic biological treatment, back-mixing with zone 4. | Clarification |

23. A method as claimed in claim 2, characterised in that the two permanent biological treatment zones (zones 2 and 3, respectively) and the two zones variably operating as a biological treatment zone and a clarifying zone (zones 1 and 4, respectively) are used, where the zones 1 and 2, 2 and 3, as well as 3 and 4 are hydraulically interconnected, and where the zones are run according to an operational cycle including the following phases A to D:

| Phase | Zone 1 | Zone 2 | Zone 3 | Zone 4 |
|---|---|---|---|---|
| A | Clarification | Influx of polluted water, aerobic biological treatment | Aerobic biological treatment, back-mixing with zone 4 | Aerobic biological treatment, back-mixing with zone 3 |
| B | Clarification | Aerobic biological treatment | Influx of polluted water, anaerobic biological treatment | Sedimentation |
| C | Aerobic biological treatment, back-mixing with zone 2 | Aerobic biological treatment, back-mixing with zone 1 | Influx of polluted water, aerobic biological treatment | Clarification |
| D | Sedimentation | Influx of polluted water, anaerobic biological treatment. | Aerobic biological treatment | Clarification |

24. A method as claimed in claim 2, characterised in that a period includes an overlapping clarification from at least two of the variable treatment/clarifying zones.

25. A method as claimed in claim 24 wherein at least one of said clarifying methods is extended for a predetermined operational cycle without an overlapping clarification.

26. A method as claimed in claim 2, characterised in that outlet extends from a variable clarifying zone to a permanent post-clarifying vessel, from which cleaned water is decanted and drained off, and where sludge is returned to a permanent biological treatment zone.

* * * * *